Feb. 21, 1961  E. H. LA BOMBARD ET AL  2,972,274
SELF BROACHING FASTENER

Filed April 18, 1955  3 Sheets-Sheet 1

INVENTORS
EMERSON H. LaBOMBARD AND
OSCAR A. SWANSON

BY Edwin Coates
ATTORNEY

Feb. 21, 1961     E. H. LA BOMBARD ET AL     2,972,274
SELF BROACHING FASTENER
Filed April 18, 1955                                                      3 Sheets-Sheet 2
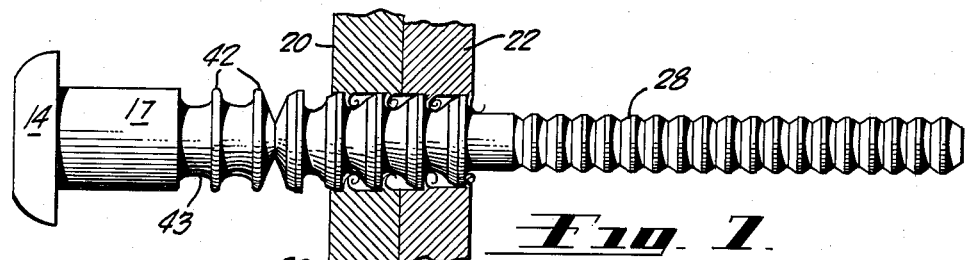
Fig. 7.
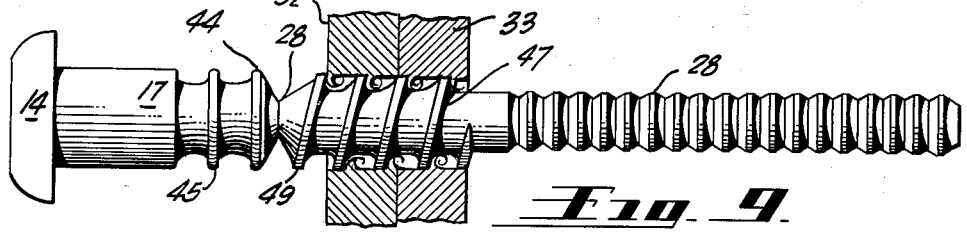
Fig. 9.
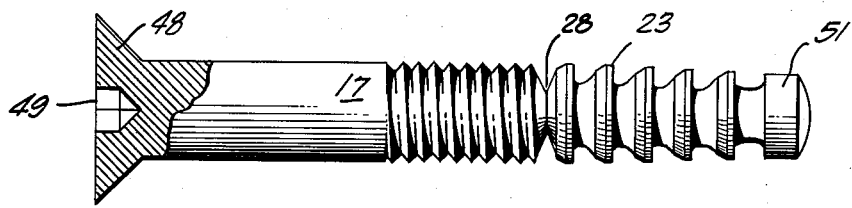
Fig. 10.
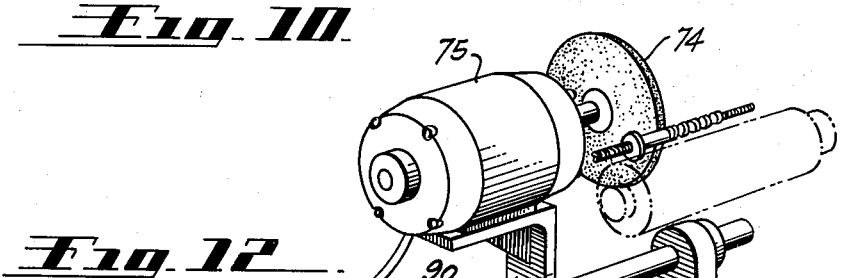
Fig. 12.
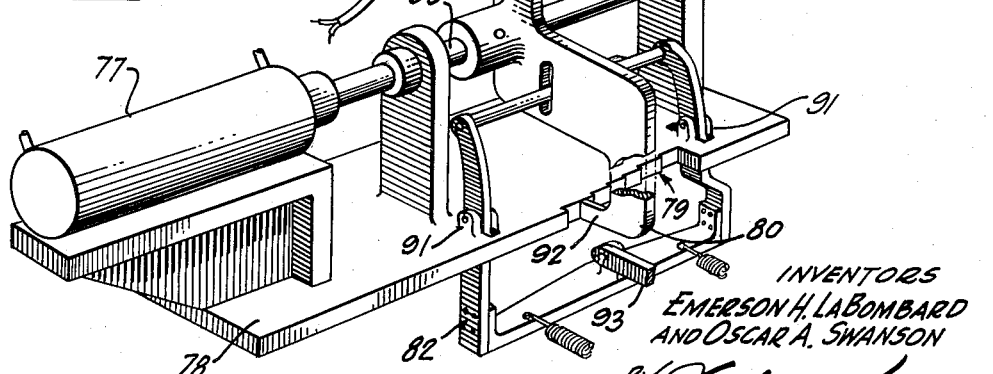
INVENTORS
EMERSON H. LA BOMBARD
AND OSCAR A. SWANSON
By J. Edwin Coates
-ATTORNEY-

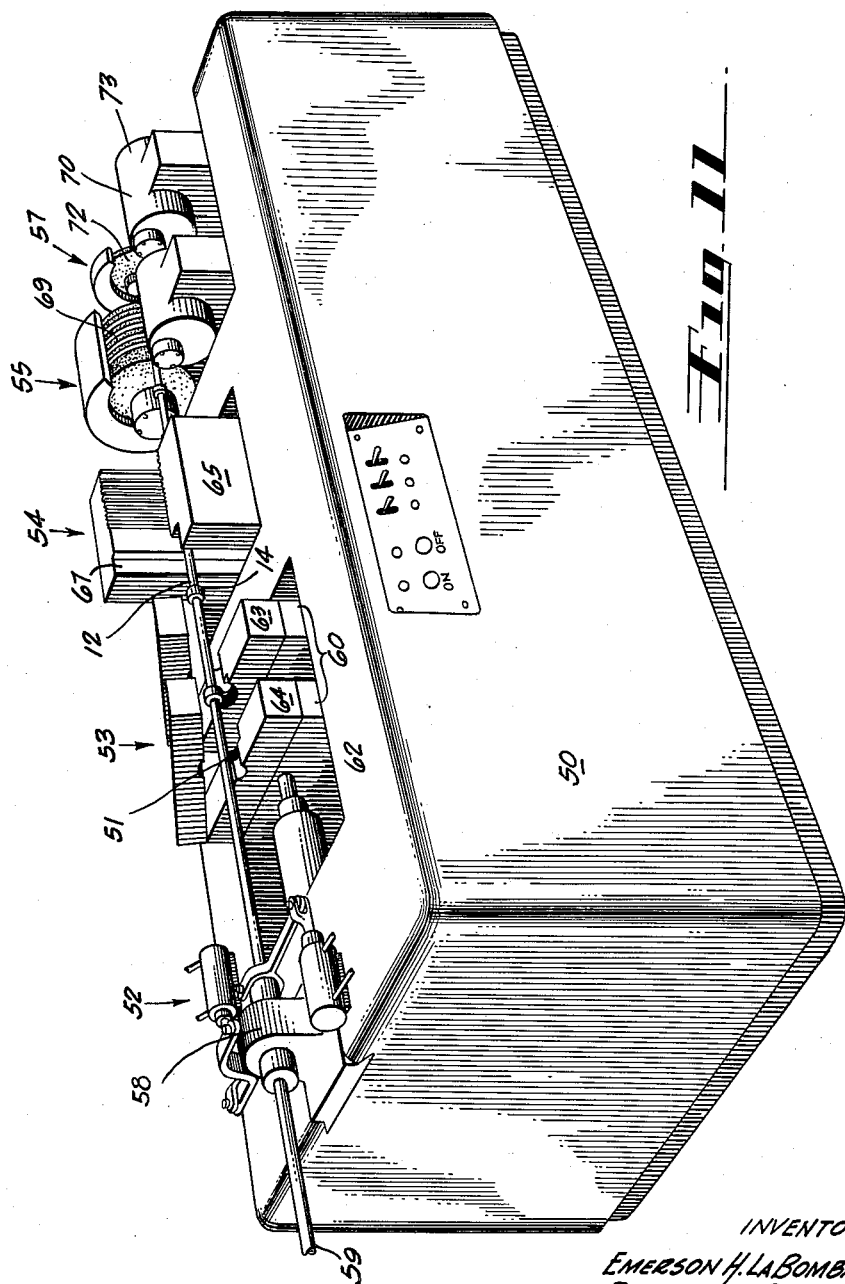

2,972,274
SELF BROACHING FASTENER

Emerson H. La Bombard, 302 17th St., Santa Monica, Calif., and Oscar A. Swanson, 550 Almar Ave., Pacific Palisades, Calif.

Filed Apr. 18, 1955, Ser. No. 502,012

4 Claims. (Cl. 85—1)

This invention relates to fasteners and particularly to those of the bolt type.

Although the means of the present invention will be perceived to be applicable generally in the fastener art, they are also particularly well adapted to use in aircraft. In sonic, transonic and supersonic airplanes it is desirable to eliminate all radial play, or clearance,, between the bolt-shank and the bolt-hole walls, for any appreciable amount of such clearance can allow the movement of the bolted parts and thus enable them to vibrate. These vibrations may, under certain conditions, last long enough or build up to a sufficient magnitude to induce fatigue in the connected parts, and fatigued metallic parts are prone to fail in flight, with obvious consequences.

Moreover in aircraft, most bolted parts are subjected to load-cycling, arising from stresses applied cyclically thereto by landing gear, cabin pressurizing means, or even by air gusts or buffeting. General looseness of fastened structural parts due to fasteners which do not fit as well as required by the standards of this invention can also result in fatigue, even in non-sonic aircraft, when the structure is subjected to load cycling.

Although these situations have been known to the art for some time, it has not been feasible hitherto to employ conventional bolts and broaches in such a manner as to obtain the type of fit between the bolt holes and the bolt-shanks that is necessary to remedy these situations. For one reason, at present the metal-removing means, such as broaches, employed in an attempt to secure radial-matching between the bolt-shank and the walls of the holes are independent of the bolts themselves and the two are not truly interrelated; that is bolts, reamers and bolt-holes are produced or provided separately in separate operations and act by separate independent operations. These facts result, invariably, in fits which are incapable of solving the present problems, for therefrom are produced diametral clearances between bolt-shanks and bolt-holes which can, and often do, vary as much as the sum of the tolerances granted for the bolt and the bolt-hole.

A further reason lies in the fact that bolts and broaches are made by separate manufacturers and are not coordinated as to tolerances, so that the bolts and broaches that are presumed to "match," very seldom do so.

In ameliorating these situations, the present invention provides a single, integral-piece but multifunctional, headed and shanked bolt-component which, when drawn thru the bolt-holes by tension or urged therethrough by thrust thereon automatically acts on the bolt-hole walls in such a way as to constrain the walls of the bolt-holes to seek and attain the exact centering, radially, with the bolt-shank in the underhead region, or "faying," portion of the shank. That is to say, the invention provides a self-centering fastener which automatically matches itself with the bolt-holes, thereby establishing either a zero-clearance fit or a true interference fit, as desired, of the bolt-hole walls and said portions of the shank.

Broadly to these, and other, ends the bolt-shank itself integrally includes metal-removing means disposed peripherally thereon, the largest diameter portion of said means having, preferably, a diameter no less than that of said faying portion of said shank. These metal-removing means are actuated or "worked" by the drawing or thrusting of the single-piece article axially of the bolt-holes, grip-means being provided on the bolt for use in pulling or pushing the bolt axially of the holes, this pushing or pulling causing the metal-removing means to constrain the hole-walls to seek center with, and congruently fit, the faying portion of the shank.

Bolt-tensioning means, adapted to engage with extraneous anchoring means, are provided on the distal-end of this faying portion of the shank.

Both the metal-removing means and the grip-means are, in the preferred species of this invention, disposed on a "break-away" extension portion of the shank joined to the cylindric portion and the tensioning portion of the shank by a tensilely frangible gullet or neck, rupturable by means of a tensile force slightly in excess of that employed to cause the metal-working formations to conform the bolt-hole walls to the cylindric portion.

Several kinds of metal-removing means are contemplated, including an adaptation of the conventional series of annular, longitudinally spaced, broach-teeth, diametrally enlarging toward the head, and a single-tooth, helically convoluted broach enlarging in diameter from the distal end of the bolt toward the head end.

Means in the nature of lap-surface forming instrumentalities are also within the purview of the invention and may take the form of toroidal or cylindric burnishing formations disposed between the metal-removing means and the bolt-tensioning and anchoring means and detachable with the pull-through and broach means by means of the inclusion of the frangible neck aforementioned.

In each and every species of the article, however, it is to be noted that the essential, basal configuration comprises an elongate piece of substantially rigid material having a head and a shank-group, a given longitudinal section, or region, of the latter group bearing peripherally extending material-removing means, the latter means, in all species, having its initial, or distal component or tooth only somewhat larger than the diameter of the initial bolt-holes, its components progressively enlarging diametrally in the direction of the head portion. The cylindrical, or under-head section of said shank group has a diameter at least as great as that of the largest-diameter component of the material-removing means. In one form, it is preferably rolled and ground to exactly the same diameter by reason of leaving the tool which finishes the last tooth on the broach-section at exactly the same inward setting towards the piece of rigid material as it finished with when this tool is longitudinally shifted toward the bolt head to finish grind the cylindric, underhead portion of the shank-group, thus to obtain an interference fit, since the spring-back, radial recovery of the walls of the holes of the order of .001 inch to .002 inch places that much metal across the longitudinal path of the cylindric section through the hole.

However, it is within the purview of this invention to render or leave the diameter of the cylindric portion somewhat larger than that of said last tooth, in order to provide an extremely tight fit of the hole walls and the cylindric portion. In fact, this configuration may be employed to obtain a true "interference fit" therebetween, one involving the use of percussion tools or the like to "drive" the bolt.

On the other hand, it is also contemplated by the invention that in cases where, for good and sufficient reason, a loose, or "free" fit of the bolt-hole walls and the cylindric portion is desired, same can be accurately provided by suitable modification of the present article to the end that the diameter of the last aforesaid tooth be rendered sufficiently and considerably larger than the diameter of the cylindric portion of the shankgroup.

In order to obtain a zero-clearance fit between the cylindric portion of the shank and the hole-walls, assuming the latter to have radial recovery or spring-back of the order, say, of .001 inch, it is only necessary to grind the diameter of the last tooth about .001 inch larger than the diameter of the cylindric section of the shank.

In any case, both the cylindric section and the material-removing means are so formed on the shank group as to lie about one and the same longitudinal axis, so as to be concentric, and to provide a positive predetermined relation between their diameters.

The thus-configured piece of material is adapted to be inserted in and axially moved into the aligned bolt-holes (or is, by virtue of its piloting function, even capable of effecting alignment of the holes if the latter lie in relatively movable structural elements), thereafter being axially moved, either by tension or thrust, thru the holes in such wise as to work the material-removing formations against the walls of the bolt-holes so as to constrain these walls finally to match the cylindric portion of the shankgroup radially, thereby to establish a substantially zero-clearance thereat; or if, the final tooth be larger, to establish the exact desired degree of clearance-fit.

The invention also provides methods and apparatus for the large-scale production of the present articles, the method, most broadly involving advancing an elongate piece of rod-stock axially; halting the rod; cold-forming a fastener-head at a forward station on this rod; advancing the rod so as to position it in a cold-rolling station; there cold-rolling, rearwardly of the formed head and rearwardly of said "faying" surface, at least a bolt-tensioning formation and a metal-removing formation in interconnected, but longitudinally spaced, relationship; advancing the rod to a finish-grinding station; there finish grinding the metal-removing formations with the finished-diameter of the diametrally largest portion of the metal-removing means preferably of no substantially greater diameter than that of said faying portion, both diameters, in one modification, being ground by the same setting of grinder-means so as to be exactly equal, thereby to establish a substantially zero-clearance fit; advancing the rod to a cut-off station wherein the then-halted rod is severed rearwardly of the metal-removing means (and rearwardly of the grip-formations, if they are present); and repeating the aforesaid steps seriatim until the rod-stock is depleted.

The rod-stock for making these articles for use with structural elements of all but the harder steels and cast iron will preferably have a tensile strength of about 180,000 lb./sq. in. and hence, especially since the article will be used but once, will not require any sort of hardening treatment, as intermediate the cold-rolling station and the grinding station in order for the broach-teeth to take and hold a proper cutting edge. It is conceivable that for articles that may be used for steels harder than those normally encountered in aircraft structures, a case-hardening step (such as flame-hardening) may be employed after the article has been thru the apparatus or, if desired, between the rolling and grinding steps.

Various types of apparatus for use in carrying out this, and the other of the present methods, are contemplated and one of them is shown and described herein.

Other objectives and accomplishments of the invention will either be made manifest hereinafter or become apparent as this specification proceeds.

Mainly in order to render these, and others, of the concepts of the present invention more concrete and to enable one skilled in this art to make and use the invention, several of the now-preferred embodiments of the article-concepts, as well as apparatus for making same by the aforementioned, and other, methods, are representationally depicted in the accompanying drawings and will be described hereinafter in conjunction with said drawings. However, it is to be understood that such drawings and said description do not disclose all possible forms of the invention at present contemplated and hence do not constitute the invention per se or limit the scope thereof, the latter being as defined in the subjoined claims.

In these drawings,

Figure 7 is a view, partly in vertical section and partly in side elevation, of a sixth species of the present article in process of being urged axially through aligned bolt-holes in faying surfaces to be united by the article upon completion of the installation procedure;

Figure 9 is a view similar to Figure 7 of a seventh species of the invention in process of installation;

Figure 10 is a side view, partly in fragmentary longitudinal section, of a seventh, and installation-wise radically different, species of the invention;

Figure 11 is a perspective, somewhat diagrammatic, view of an apparatus for quantity-production of the novel article by means of the present method, and Figure 12 is an enlarged fragmentary perspective detail of a modification of part of the apparatus shown in Figure 11.

Figure 1:
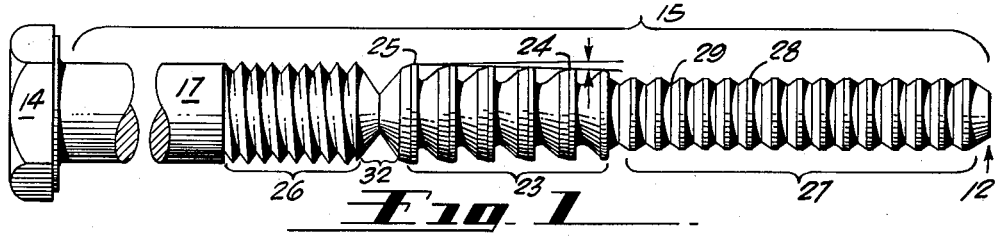
Figure 1 is a fragmentary side view of one of the articles embodying the present invention.

In all the illustrated, and other, embodiments of the invention, the general configuration comprises certain novelties combined with predetermined length 12 of some such substantially rigid material as "bolt-steel," machine-steel, or the like formed, in much the conventional manner, into a fastener-component of the elongate pull-through or push-through type having a head 14 terminating an unusually elongate shank-group 15 adapted to be tensioned and anchored by an anchoring member, such as a nut or a collar engaged with a portion of the length of the shank-group. As is usual, the shank-group of the fastener-component includes, adjacent the head, a first, or cylindric section 17 to be matched or mated exactly, or with zero-clearance, or controlled interference or looseness fit with the walls of the fastener holes 18 and 19 in two, or more, faying members or structural elements, 20 and 22, respectively. This first section is initially of a diameter somewhat greater than the initial, or bored, diameter of holes 18 and 19, but the latter are, as hereinafter disclosed, brought into exact congruency with the cylindric first section 17.

This general configuration of the shank-group also includes a second, or material-removing section, 23 which, in most species of the article, comprises a broaching instrumentality. Preferably, the broach group consists of a plurality of separate, longitudinally spaced, annular broach teeth, the initial tooth 24, being either slightly larger than the hole-diameter, equal to same, or less than same, the teeth progressively enlarging diametrally in increments of about .002 inch from tooth 24 toward head 14 to the largest diameter, final tooth 25. Preferably, tooth 24 is slightly smaller than the holes in order to facilitate centering and to graduate the broaching action. Preferably, also, the diameter of cylindric section 17 is at least as great as that of tooth 25, therefore being either equal to its diameter or greater than said diameter.

Depending upon the nature of the matching of centering desired of the cylindric portion 17 and the walls of the bolt-holes, the largest tooth 25 may, in order to provide, coupled with the recovery or springback of the hole-walls, a zero-clearance fit, have a diameter somewhat greater than that of cylindric section 17. In order to provide an interference fit, the last tooth 25 may have a diameter equal to, or somewhat less than that of the cylindric section 17, to take "recovery" into account.

In most usages, the diameter of tooth 25 is exactly equal to that of section 17 and can be rendered so by novel apparatus and methods hereinafter disclosed, by means of which tooth 25 is finish-ground at a certain set-diameter of the grinding tool which is then moved longitudinally at exactly the same cut-depth setting, to finish grind the cylindric section 17. By these means, exact correspondence of the walls of the bolt-holes with the cylindric portion is assured, for when the shank-group is inserted into and moved axially into these holes sufficiently, the material-removing means 23 acts on said walls so as to constrain them to radially exactly match cylindric section 17 to thereby establish an interference fit thereof, since wall recovery tightens the fit.

In any case, the cylindric section 17 and the material-removing means 23 are formed about one and the same longitudinal axis so as to be concentric.

Also, in most species of the invention, at the end-portion of the shank-group that is most distal from the head, and lying longitudinally adjacent to the material-removing means, there are provided surfaces or grip formations 27 constituting a third section of the shank-group and adapted to interengage with a pull-through tool. This tool, as is well-known, comprises means for exerting a longitudinally directed pull, or tension, on the shank-group of the fastener component, this pull being exerted either intermittently and at stations progressively closer to the broach unit, as, for example, by means of a so-called "Huck gun," not shown, but made and distributed by the Huck Manufacturing Company of Detroit, Michigan; or exerted continuously at a fixed station, as by means of a so-called Hanna puller, or any other suitable type of mechanical "puller."

Figure 5:
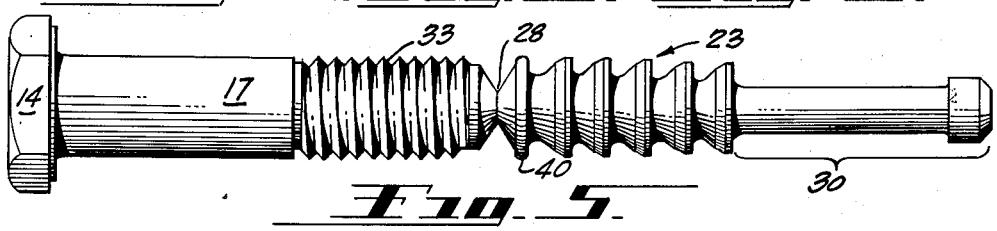
Figure 5 is a view similar to that of Figure 1 and showing a fourth species of the advanced article disengaged from structure.

In the former case, the third section, 27, consists of a plurality of relatively narrow, annular ridges 28, spaced relatively closely and separated longitudinally by relatively shallow grooves 29, the two kinds of formations serving to be gripped by the "jaws" of the Huck gun. In the latter case, the third section 27 comprises an elongate gullet-like formation or grip 30, as illustrated in Figure 5, consisting of a central, necked-down portion terminated at each end by a convexity or knob, thus adapting this section to interengage with a Hanna puller.

The shank-group also includes, in most species of the invention, a fourth section 32 constituting means for detachably or frangibly joining or integrating the "standing" section, or cylindric section, to the other sections of the shank-group and providing an instrumentality whereby continuance to a predetermined degree of the longitudinal pull applied to the third section by the aforesaid pull-thru tool will separate these other sections from the sanding section or sections. This fourth section 32 consists preferably of a constriction or gullet rolled diametrally into the shank group at the distal end of the "standing" group, the latter usually comprising the cylindric section just under the fastener head and the fastener-tensioning section, such as threads, rings, or teeth, as later explained. It will thus be seen that in all but the special case of Figure 4, the high loads involved in the broaching operation are not applied to the break-neck section which merely carries the tension load necessary to seat the shank of the fastener in the broached hole.

Figures 2, 3, 4:
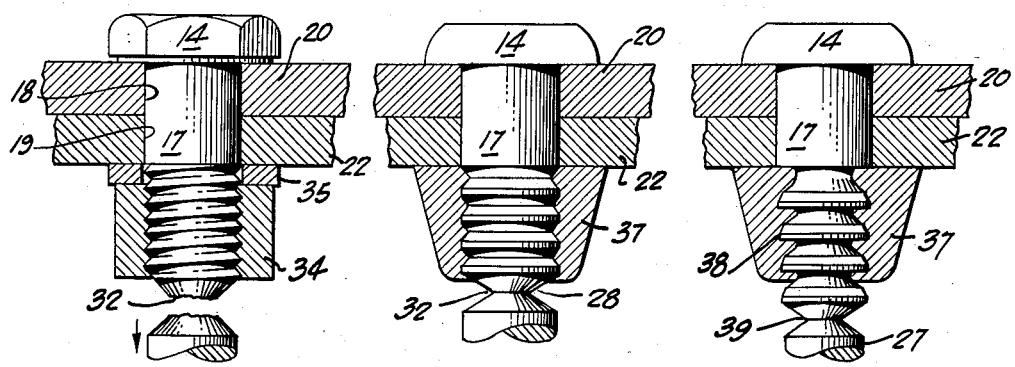
Figure 2 is a view, partly in section and partly in fragmentary elevation, of a pair of structural members as united by the combination bolt-and-broach article of the species shown in Figure 1, the article being shown fragmentarily with the tensioning or anchoring component in place and the non-fastening portion broken away.
Figure 3 is a similar view of a second species of the present article with the non-fastening portion still attached, employing another kind of tensioning and tensioner-engagement component, as well as a consequently different type of interengagement therebetween.
Figure 4 is a similar view of a third species of the novel article, including a different type of tensioner-engagement component on the fastener shank.

With these general considerations in mind, the species depicted in Figures 1 and 2 specifically modifies the foregoing general elements to include, as the component-tensioning means, a set 33 of helical screw threads disposed longitudinally adjacent the cylindric, or bearing, section 17. These threads may be of any desired or suitable variety, such as Vee, U.S. Standard, Dardalet, Armstrong-Whitworth, flat-Vee, or the like, and are adapted to interengage with an anchoring or abutment-establishing means 34 in the form of a nut correspondingly threaded so as to anchor the installed fastener-component or the standing-portion thereof, in the manner shown in Figure 2, the employment of a washer 35 being preferable for use in conjunction with faying sheets 20 and 22 of the usual composition.

In the species of Figures 1 and 2, the material removing means 23 takes the form of metal-broaching teeth, including of course an initial tooth 24 and a final tooth 25 and intermediate similar teeth of diameters enlarging from the smallest diameter at 24 to the largest, at 25; and the pull-thru engaging means takes the form of Huck-rings 28, shaped and arranged substantially as aforedescribed. The broach teeth here are annular, longitudinally spaced mutually apart, and taperingly enlarge diametrally towards the head. Between the adjacent teeth, chip-grooves are provided which accommodate the ring-like chips and prevent them from marring the broached-surfaces of the bolt-holes.

In the embodiment shown in Figure 3, the general configuration is as described before the description of Figure 1, but here the fastener-tensioning group, 26, of Figure 1, for tensioning the fastener-component, that is, for interengaging with the anchoring means to secure the faying members 20 and 22 together, are replaced by a plurality of narrow, annular ridges 28 separated by relatively shallow grooves, somewhat resembling the Huck-rings aforedescribed but not serving as a grip-means for a Huck-gun or the like. Instead, rings 28 constitute hard, metal-penetrating formations, for interpenetration with a somewhat softer annular anchoring or abutment-member, such as a collar 37, here shown as swaged into interengagement with these formations 28.

The species of Figure 4 embodies the same principle of tensioning and anchoring the fastener-component but employs somewhat different means for tensioning the fastener-component and interengaging the collar and the "standing" portion of the shank-group, these means here taking the form of a plurality of headwardly enlargingly tapered, annular broach teeth 38 of dual-nature. Thus, the teeth 38 perform the dual function of compelling the bolt-bores to match the cylindric first section of the shank-group and thereafter serve as the aforesaid tensioning and interengaging means for a collar 37.

Longitudinally outwardly of means 38, the shank-group of this species includes a break-away means 39, followed outwardly by a pull-through grip or third section, 27, which may well be either one adapted for engagement by a Huck gun or a Hanna puller.

In Figure 5 the species illustrated is fundamentally the same as that of Figure 1 but incorporates a fifth section 40 for producing a kind of lap-fit of the hole-walls and the highly-finished first-section 17; and this species also modifies the conformation and action of the grip-section, or third section, into a Hanna-puller interengager 30.

Figure 6:
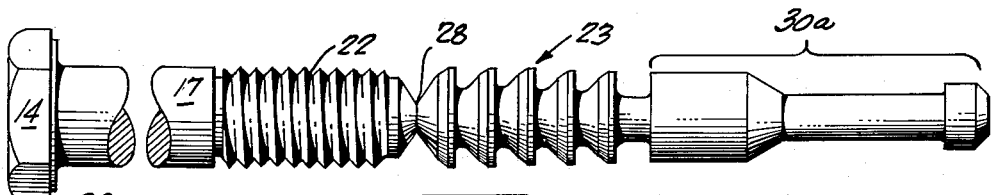
Figure 6 is a fragmentary side view of a fifth species of embodiment of the invention.

The species of Figure 6 is essentially the same in configuration and function as that of Figures 1 and 2, differing therefrom principally in that its third, or grip, section is conformed to a Hanna puller 30A rather than to the jaws of a Huck gun, the member 30A having a shorter gullet and longer knobs than those in Figure 5, thus illustrating the flexibility of the present design-principles by showing its adaptability to various auxiliary or installation tools without entailing drastic alterations in the principles of the invention.

Figure 8:
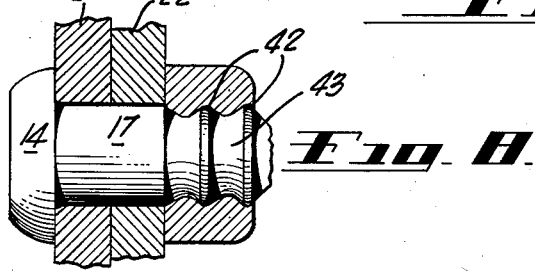
Figure 8 is a view, partly in vertical section and partly in side elevation, showing the article of Figure 7 tension-anchored to structural members it in turn secures together, after completion of the installation procedure.

In the embodiment shown in Figures 7 and 8, the basal configuration of the shank-group is essentially the same as that of Figure 1, the component-tensioning means, however, here being of a novel type designatable as the deep-take, or "vertebrae" type and consisting of a small number of planishing rings 42 longitudinally separated by wide deep grooves 43 the rings and grooves being well adapted to interpenetrate deeply with the body of a swageable collar like the collar of Figure 3. Thus, when installed, as shown in Figure 8, these means enable the fastener component and its collar to withstand considerable disassembling tension, or shear.

In the species of Figure 9, the configuration of Figure 7 is modified in the fastener-tensioning section and in the metal-removing section. The fastener-tensioning section is generally of the "deep-take" type, but the ridge 44 that lies distal from the head is generally semi-toroidal instead of entirely cylindrical, although the proximal edge thereof may terminate in cylindric form. The member 44 thus includes a spheric-type burnisher and a cylindric type burnisher in the one ridge-like formation, serving to impart a mirror-like finish to the walls of the bolt-holes with minimum effort. At the same time, element 44, in cooperation with the other, and cylindric, ridge 45 and the intervening grooves, serves well to interengage the swaged anchoring collar to the standing portion of the shank-group.

In this species, further, the metal-removing means takes the form of a helical, single-tooth broach 47, diametrally tapering forwardly, or longitudinally outwardly of the shank group. This article is hence adapted for rotary, or torquing, pull-through, as well as axial pull-through, with concomitant advantages. Preferably, the article is outwardly terminated by grip formations of the type adapted for cooperation with a Huck-gun. It is to be understood that the helical tooth broach of Figure 9 may be substituted for the multiple tooth broaches of any of the other forms of invention disclosed herein.

All the species illustrated, except that of Figure 10, are installed to leave the cylindric section or bearing portion congruent with the bolt-holes with the anchoring portion and a portion of the cylindric section projecting, the installation being effected by means of a pull-through device, as aforedescribed. The article of Figure 10, however is of such a nature as to adapt it to be pushed through the faying members 20 and 22, that is, to be axially moved by a thrust exerted on its head-portion in lieu of a tension exerted on its distal end-portion.

To this end, a suitable percussion tool, even including a rivet gun or the like, may be mounted or supported against the structure to be secured, or on adjacent structure by suitable tool-bracing means, not shown, the work being backed up on the opposite face of the faying members by suitable "bucking means," not shown.

The fastener-component of Figure 10 partakes generally of the same basal configuration as that of the other species, the principal changes eventuating from this alteration to push-through from pull-through residing in the incorporation of a flush, or countersunk, type of head 48 instead of a convex head and in the omission, of course, of any sort of grip formations on the distal-end of the shank group.

The push-through tool may well engage flatly facewise with the face of the fastener-component head, but a seat or receptacle 49 may be sunk in this head for engagement by any tool suitable for removing the installed fastener by torquing action. Outwardly of the broach teeth there is provided a piloting means 51 for guiding the article into the bolt holes, especially useful when the holes are not initially aligned.

The present invention also provides novel methods of making the novel articles and apparatus for performing these methods, and others, is representationally illustrated in Figures 11 and 12.

The apparatus shown in Figure 11 combines with a typically cold-header variety of bolt-making machine, that includes means for feeding a length of rod-stock axially to various longitudinally aligned stations, means for simultaneously cold-rolling on the headed sections of the rod-stock all five of the shank-group sections aforementioned, together with means for finish grinding such of these five sections as require it.

In the somewhat diagrammatic form presented by way of example, the apparatus comprises, in combination a base or foundation and casing, 50, a bar-stock feeding group 52; a heading, or cold-upsetting group 53; a cold-rolling group 54; a finish-grinding group 55; and a cut-off or segmenting group 57.

The feeding group comprises, in the manner usual in coldheaders, collet means 58 actuated by the conventional hydromotors and linkage, as shown, for advancing the rod-stock 59 axially and intermittently, thus advancing and halting the rod as required. This group also serves to prevent back-feeding of the rod from any station under the reaction of the tooling working on it at that station, as is well known.

The heading-group 53 of course, includes a double-jawed clamp, 60 with semi-cylindric grooves 62 formed in the jaws in the usual manner for the passage of the rod-stock, as shown. One of these clamps is fixed, as at 63, and includes die-sockets 51 therein, for the reception of the metal upset thereinto by movement theretowards of the other jaw so as to form heads at longitudinally spaced stations on the rod-stock when the longitudinally hydraulically-movable clamp 64 is forced towards the stationary clamp 63.

The cold-rolling group 54 receives the headed segment of rod, which is then released by the collet so as to permit rotation thereof about its axis and while rotating it, the vertically movable cold-rolls 65 and 67 roll peripherally in the shank-group, the tensioning, break-away, burnishing, metal-removing and pull-through formations, the respective relative locations thereof on the shank being alterable by employing various vertically reciprocatable rolling blocks in place of those, 65 and 67, shown as provided with die-former faces for rolling out the species of Figures 1 and 2.

In accordance with modern practice, these cold-rollers final form all the formations required on the shank-group except the final finish-diameters of the seriate broach-teeth, which final-tolerances are ground by the finish-grinder wheels in the next station; and the necking-down grinding of the frangible portion and the cutting off step, may both be performed in the final station of the apparatus.

Upon being urged axially forwardly from the forming rollers, the rod-stock advances to the finish-grinding means 55 for grinding the final cylindric surfaces on the broach-teeth. These means include a laterally movable set 69 of rotary grinding surfaces integrated on a single shaft, opposed, on the other side of the rod-stock, by a corresponding fixed set 70 of regulating-wheels of the grinder type, the latter also serving as back-up means for the former. Co-operation of the two sets finish-edges the broach teeth and concurrently finish-grinds the cylindric-section or underhead section of the shank-group to the desired polish-finish and diameter which the bolt-hole walls are to match. Since the diameter of the grinding wheel surface that finish-grinds the last, or largest, broach tooth can be exactly the same as that of the grinder surface that finishes the underhead cylindric surface of the shank-group and cuts radially into the rod-stock exactly the same distance, it will be perceived that the largest broach tooth can be made to so act on the bolt-hole walls as to cause the latter to radially seek exact-center with the cylindric portion of the shank. Thus, in station 55, the final cylindric surface, or cutting edge, of each broach tooth is ground to the particular tolerance requisite for that tooth, all the other surfaces of each tooth having been finish-rolled in station 54, the cold-rollers. The burnisher and the pull-through formations are also cold-rolled in station 54.

As aforementioned, however, if desired the grinding means may be such as to render the diameter of the last tooth greater than or less than that of the cylindric portion so as to effect either a spring-back fit or a true interference fit of the drive-jam type between the cylindric portion of the shank and the bolt-hole walls.

The cut-off group 57 is constructed and arranged to sever the rod-stock at the jointure of the bolt-head 14 of the finished fastener component with the approaching end of the shank-group of the next approaching bolt-segment of the rod-stock. In the well-known manner, it may consist of a thin, high-speed cut-off disk 72 of abrasive material, laterally movable against and away from the halted rod-stock. Regulating wheels 73 are disposed opposite the unit 73 in the usual manner, the mechanism is shown as primarily for merely finish-grinding the final tolerance-surface on the broach teeth only, although by obvious suitable modification the mechanism can be made to finish grind the cylindric section, the break away neck and the burnisher.

In Figure 12 there is shown a modification of the grinding unit 55 of Figure 11. Here, as in Figure 11, the final-tolerance surfaces are ground on the successive, diametrally tapering broach teeth. As will be perceived, however, these means may be employed also, by virtue of obvious suitable alterations, to grind the break-away necks, the burnishers, and the cylindric section, if desired. The mechanism of Figure 12 is adapted to operate upon the cold-rolled threads and broach teeth, etc., as they come from the cold-rolling unit 54, and essentially comprises longitudinally movable and laterally swingable grinding means, including an abrasive wheel 74 which is driven by an electric motor 75. This wheel unit is longitudinally protractable and retractable by means of a double-acting hydromotor 77, and is laterally swingable toward and away from the then stationary work piece.

The wheel 74 is, in Figure 12, shown in its initial position, presumably having just finish ground the cylindric section, and being ready for its rightward propulsion by the hydromotor 77 and its associated mechanism. In finish-grinding the final, or diametrally-largest broach tooth, the wheel preferably remains at the same radially-inwardly reaching setting it has when grinding said cylindric section. However, the relative diameters of this largest tooth and the cylindric section may be varied as, and for the purposes, hereinabove set forth.

In order to provide these functionings so as to finish-grind these teeth at progressively decreasing diameters, proceeding in the direction away from the head, the mechanism of Figure 12 includes a base or platform 78, the near edge of which bears a series of steps or cams 79 which progressively step back this edge from the hydromotor end of it toward the opposite end. In cooperation with means hereinafter described, these steps and their arrangement assure exactitude of the respective diameters of the respective cutting edges of the broach teeth. They act as cams for a dual nature element 80 which functions both as a cam-follower and a grinding-unit support arm, as shown. Member 80 is rotatably mounted, near its upper end, on the retractable and protractable piston rod 90 of the hydromotor 77. Arm 80 is normally urged inwardly against the work by means of a spring-biased yoke-like member 82 which is pivoted at points 91 to the platform for swinging inwardly and outwardly. A slot, as shown, is provided in the arm for receiving the upper horizontal element of the yoke-like member therethrough.

The lower end 92 of arm 80 is recurved inwardly, and, by virtue of the spring-loaded yoke arrangement, it follows the steps as member 80 is bodily translated rightward by the hydromotor and piston rod. A hand-operated shift-lever 93 is clevised to the lower horizontal element of the yoke unit and can be urged inwardly so as to disengage the grinding wheel 74 from the work in order to allow same to axially move rightwardly past the wheel; or to enable such actuation of the hydromotor as will shift the wheel back and forth to selective grinding loci on the shank such as for forming the breakaway neck, the burnishers, etc., and for cut-off of the bar-stock.

Thus, as the hydromotor protracts its piston and the wheel 74 translates longitudinally outwardly, the arm 80 successively steps-into the successive indentations after following the preceding cam surface to cause the wheel to successively finish grind the loci on the shank. If desired, wheel 74 can obviously also be made to sever the rod-stock at the outermost end of each fastener-component.

Assuming that the frangible gullets or throats be independently ground with a separate form-wheel or the like, the invention also contemplates that a single-piece, multi-surface grinding wheel could be employed at the head end of the apparatus of Figure 11 and could ride down the series of cam steps without having to be intermittently pulled away from the work.

Although certain members of the various physical embodiments of the invention have been, for the sake of concreteness and clarity, been described in terms of specific composition, shape, geometrical aspects, etc., it is to be understood that such specificity in no wise constitutes the invention or restricts its incorporation to these particular parameters, since the invention is, both in tact and at law, susceptible of embodiment in any particular form that lies within the scope of the subjoined claims defining the minimum essential syntheses of its elements.

We claim:

1. A self-broaching, center-seeking fastener component for establishing a high shear, controlled interference fit in aligned holes in structures to be united, comprising: a substantially rigid elongate article having a head and a stem-group, the latter including a shear-taking shank adjacent the head and to be centered in the holes; a fastener receiving portion adjacent the shank; a hole sizing section located onward from the fastener receiving portion and comprising a plurality of broach teeth formed on the same longitudinal center as said shank, the tooth most remote from the shank having a diameter approximating the original diameter of said holes and the diameters of said teeth progressively increasing toward said shank, the largest of said teeth being sized with relation to the diameter of the shank to produce a predetermined interference fit between the shank and the broached holes; and means formed on the stem-group adjacent the free end thereof and shaped for engagement with a pull-through instrumentality; said stem-group having its portion of minimum tensile strength located between said fastener receiving portion and said hole sizing section; whereby the full strength of the stem group is available for pulling said sizing section through said holes and said minimum tensile strength portion may be broken by application of substantial force when the shank has been seated in the sized holes.

2. A self-broaching, center-seeking fastener component for establishing a high shear, fit, of a wide range of degree of fit, said range being independent of the diameter of the center-seeking portion of the fastener, in aligned holes in structures to be united, comprising: a substantially rigid elongate article having a head and a stem-group, the latter including a shear-taking shank adjacent the head and to be centered in the holes; a fastener receiving portion adjacent the shank; a hole sizing section located onward from the fastener receiving portion and comprising broach means formed on the same longitudinal center as said shank, the smallest diameter of said broach means approximating the original diameter of said holes and the largest diameter of said broach means bearing a controllable ratio to the diameter of said shank and said ratio being independent of the diameter of the shank, to produce a predetermined degree of tightness or looseness of fit between the shank and the broached holes; and means formed on the stem-group adjacent the free end thereof and shaped for engagement with a pull-through instrumentality; said stem-group having its portion of minimum tensile strength located between said fastener receiving portion and said hole sizing section.

3. A fastener component as claimed in claim 2 and, in addition thereto, a burnishing instrumentality formed on said stem group adjacent the larger diameter end of said broach means.

4. A self-broaching, center-seeking fastener component for establishing a high shear, controlled interference fit in aligned holes in structures to be united, comprising: a substantially rigid elongate article having a head and a stem-group, the latter including a shear-taking shank adjacent the head and to be centered in the holes; a fastener receiving portion adjacent the shank; a hole sizing section located onward from the fastener receiving portion and comprising broach means formed on the same longitudinal center as said shank and sized to enlarge said holes to a diameter providing a predetermined interference fit with said shank; means formed on the stem-group adjacent the free end thereof and shaped for engagement with a pull-through instrumentality; and a portion of said stem-group between said fastener receiving portion and said hole sizing section being formed with a reduced diameter to having the least tensile strength of said stem group and constituting a break-neck section.

References Cited in the file of this patent

UNITED STATES PATENTS

| | | |
|---|---|---|
| 1,394,608 | Davern | Oct. 25, 1921 |
| 2,041,759 | Halborg | May 26, 1936 |
| 2,282,711 | Eklund | May 12, 1942 |
| 2,341,469 | Newall | Feb. 8, 1944 |
| 2,356,686 | Newall | Aug. 22, 1944 |
| 2,510,076 | Cockrell | June 6, 1950 |
| 2,531,048 | Huck | Nov. 21, 1950 |
| 2,643,443 | La Pointe et al. | June 30, 1953 |
| 2,895,367 | Nagy | July 21, 1959 |